(12) United States Patent
Yoshida et al.

(10) Patent No.: US 10,480,704 B2
(45) Date of Patent: Nov. 19, 2019

(54) PULSATION DAMPER

(71) Applicants: FUJIKOKI CORPORATION, Tokyo (JP); DENSO CORPORATION, Aichi (JP)

(72) Inventors: Shin Yoshida, Tokyo (JP); Takao Okada, Tokyo (JP); Makoto Sudo, Tokyo (JP); Osamu Hishinuma, Aichi (JP); Hiroatsu Yamada, Aichi (JP)

(73) Assignees: FUJIKOKI CORPORATION, Tokyo (JP); DENSO CORPORATION, Aichi (JP)

( * ) Notice: Subject to any disclaimer, the term of this patent is extended or adjusted under 35 U.S.C. 154(b) by 110 days.

(21) Appl. No.: 15/576,713

(22) PCT Filed: May 11, 2016

(86) PCT No.: PCT/JP2016/063949
§ 371 (c)(1),
(2) Date: Apr. 4, 2018

(87) PCT Pub. No.: WO2016/190096
PCT Pub. Date: Dec. 1, 2016

(65) Prior Publication Data
US 2018/0306368 A1 Oct. 25, 2018

(30) Foreign Application Priority Data

May 27, 2015 (JP) .................. 2015-107363

(51) Int. Cl.
*F16L 55/053* (2006.01)
*F02M 51/00* (2006.01)
(Continued)

(52) U.S. Cl.
CPC ....... *F16L 55/053* (2013.01); *F02M 37/0041* (2013.01); *F02M 51/00* (2013.01);
(Continued)

(58) Field of Classification Search
CPC ... F16L 55/053; F02M 37/0041; F02M 51/00; F02M 55/00; F02M 55/04; F02M 59/26;
(Continued)

(56) References Cited

U.S. PATENT DOCUMENTS

| 4,513,194 A * | 4/1985 | Mastromatteo .... B23K 15/0086 |
| | | 219/121.13 |
| 6,901,914 B1 * | 6/2005 | Becene ................ F02M 69/465 |
| | | 123/456 |

(Continued)

FOREIGN PATENT DOCUMENTS

| JP | 2007-309118 | 11/2007 |
| JP | 2012-197732 | 10/2012 |

(Continued)

OTHER PUBLICATIONS

International Search Report for corresponding International Application No. PCT/JP2016/063949 dated Jun. 28, 2016.

(Continued)

*Primary Examiner* — Eric Keasel
*Assistant Examiner* — David R Deal
(74) *Attorney, Agent, or Firm* — Renner, Otto, Boisselle & Sklar, LLP

(57) ABSTRACT

A pulsation damper includes an upper diaphragm, a lower diaphragm configured to form a sealed space having a predetermined pressure with the upper diaphragm, in which an inert gas is filled; and a deformation suppressing member formed of an elastic material, and comprising an inner cylindrical portion, and an extension portion extending from a center portion on an outer peripheral surface of the inner cylindrical portion such that the extension portion extends outward from a center axis of the inner cylindrical portion, wherein the deformation suppressing member is arranged inside the sealed space such that an outer periphery of the (Continued)

extension portion abuts against inner walls of the upper diaphragm and the lower diaphragm.

12 Claims, 8 Drawing Sheets

(51) Int. Cl.
*F02M 55/00* (2006.01)
*F02M 59/26* (2006.01)
*F02M 59/36* (2006.01)
*F02M 59/44* (2006.01)
*F02M 59/46* (2006.01)
*F02M 37/00* (2006.01)
*F02M 55/04* (2006.01)
*F16J 3/02* (2006.01)

(52) U.S. Cl.
CPC ............ *F02M 55/00* (2013.01); *F02M 55/04* (2013.01); *F02M 59/26* (2013.01); *F02M 59/36* (2013.01); *F02M 59/44* (2013.01); *F02M 59/447* (2013.01); *F02M 59/46* (2013.01); *F16J 3/02* (2013.01); *F02M 2200/315* (2013.01)

(58) Field of Classification Search
CPC ...... F02M 59/36; F02M 59/44; F02M 59/447; F02M 59/46; F02M 2200/315; F16J 3/02
USPC ......................................................... 138/30
See application file for complete search history.

(56) References Cited

U.S. PATENT DOCUMENTS

| | | | |
|---|---|---|---|
| 8,562,315 B2 * | 10/2013 | Inoue | F02M 55/04 417/413.1 |
| 8,662,868 B2 * | 3/2014 | Oikawa | F04B 37/12 417/540 |
| 8,955,550 B2 * | 2/2015 | Oikawa | F16L 55/04 138/30 |
| 9,074,593 B2 * | 7/2015 | Kobayashi | F04B 11/0008 |
| 9,777,879 B2 * | 10/2017 | Fujita | F04B 39/0033 |
| 2011/0017332 A1 * | 1/2011 | Bartsch | B60T 8/4068 138/30 |
| 2015/0017040 A1 | 1/2015 | Hishinuma et al. | |
| 2015/0260133 A1 | 9/2015 | Iwa et al. | |

FOREIGN PATENT DOCUMENTS

| | | |
|---|---|---|
| JP | 2014-088870 | 5/2014 |
| JP | 015-017583 | 1/2015 |
| JP | 2015-017585 | 1/2015 |
| JP | 2015-017621 | 1/2015 |

OTHER PUBLICATIONS

Written Opinion for corresponding International Application No. PCT/JP2016/063949 dated Jun. 28, 2016.

* cited by examiner

[Figure 1]
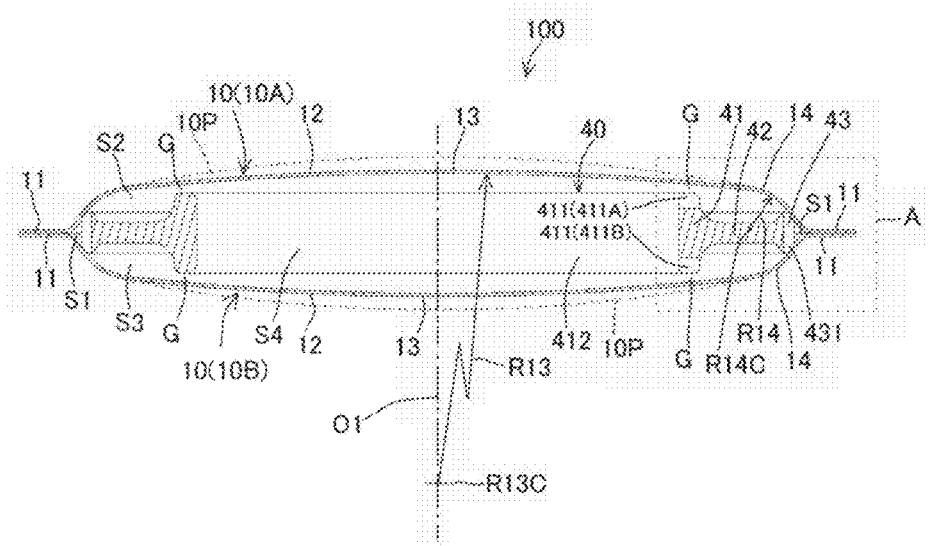
[Figure 2]
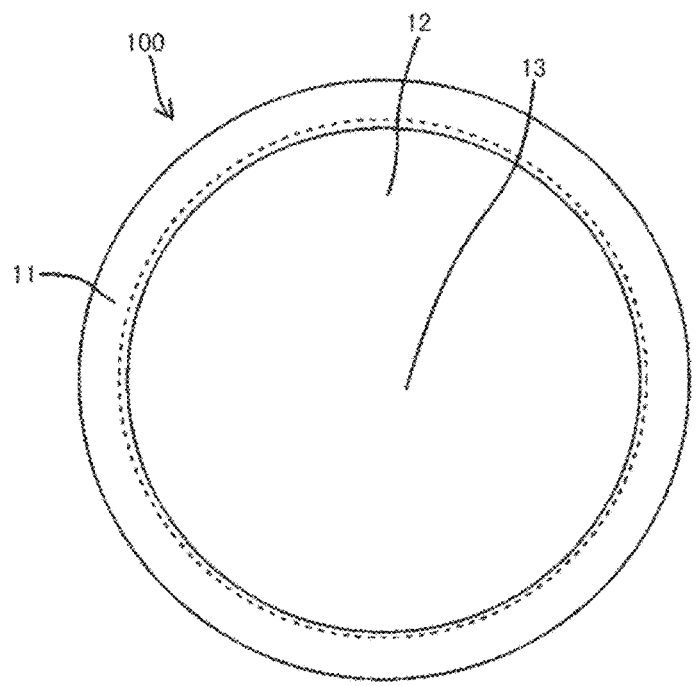

[Figure 3]
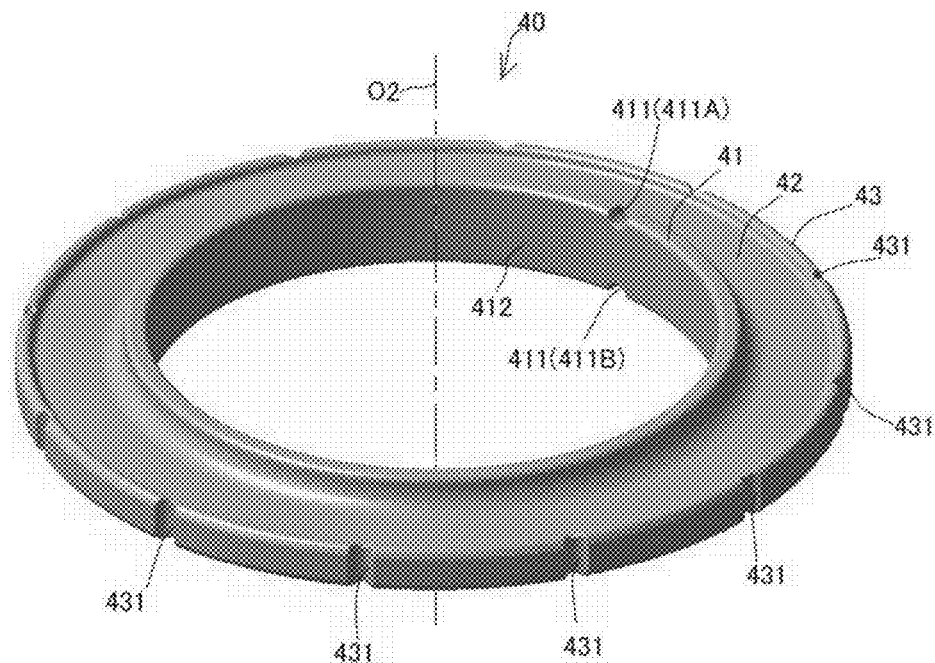
[Figure 4]
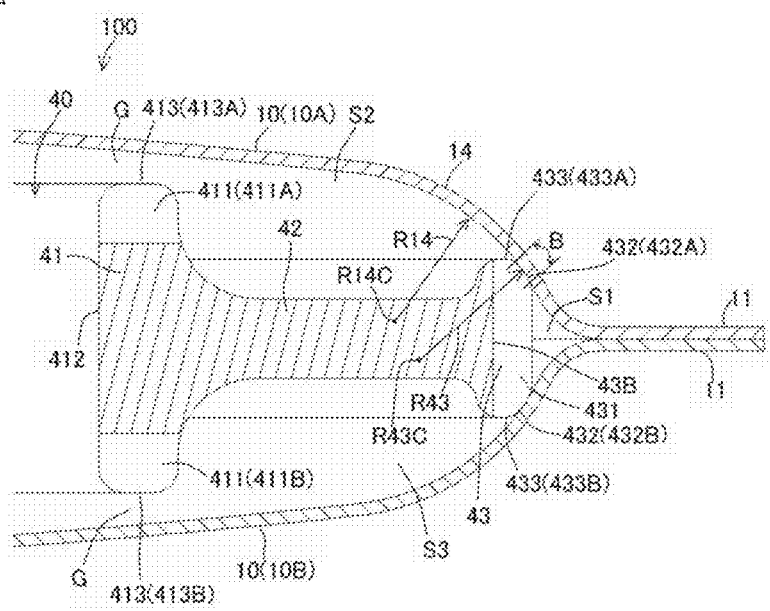

[Figure 5]
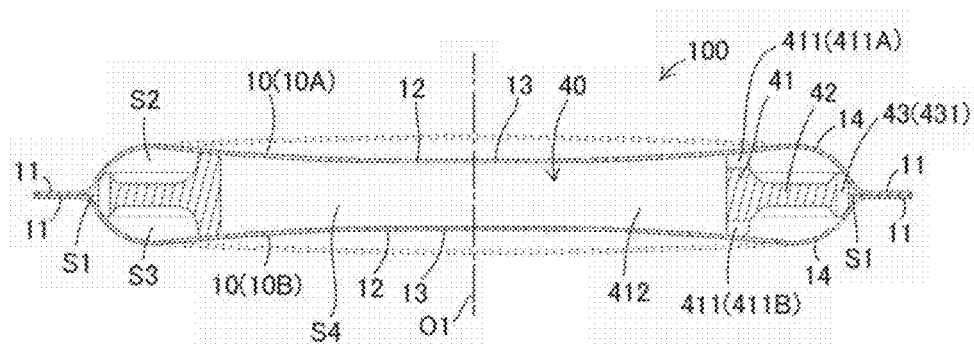
[Figure 6]
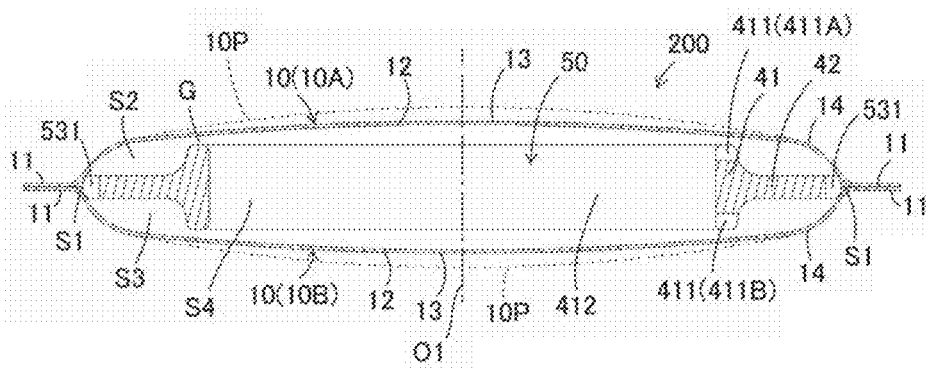

[Figure 7]
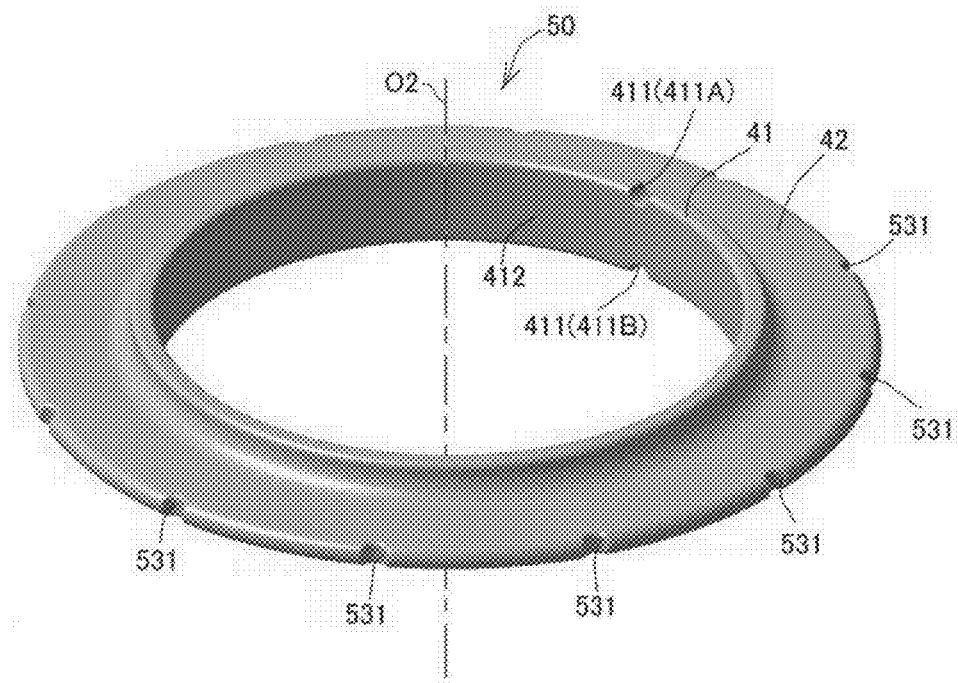
[Figure 8]
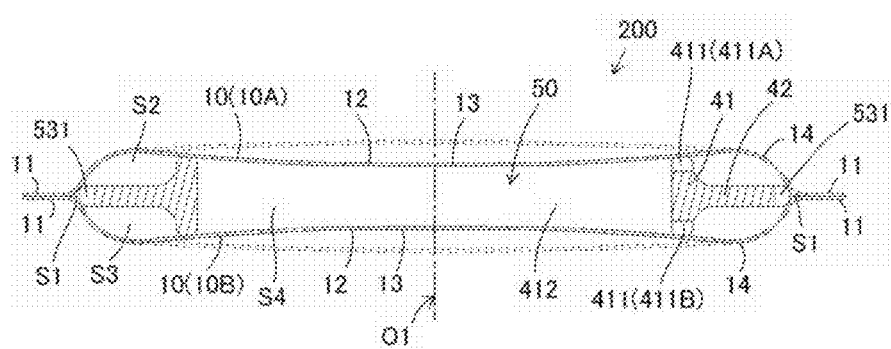

[Figure 9]
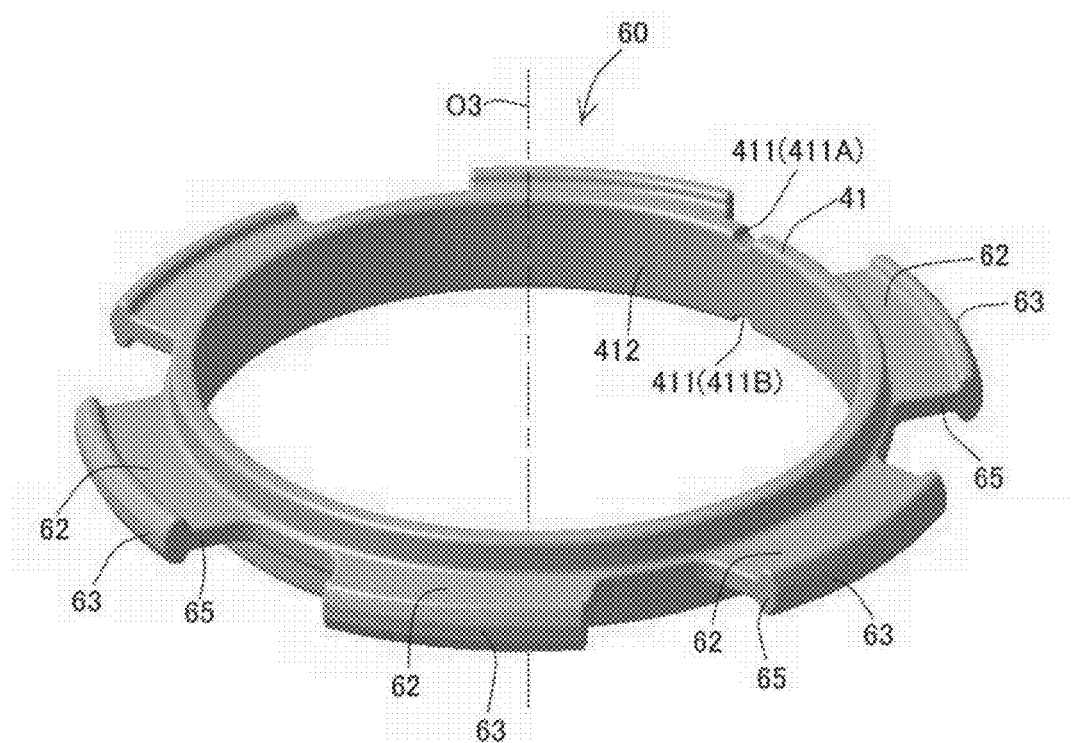
[Figure 10]
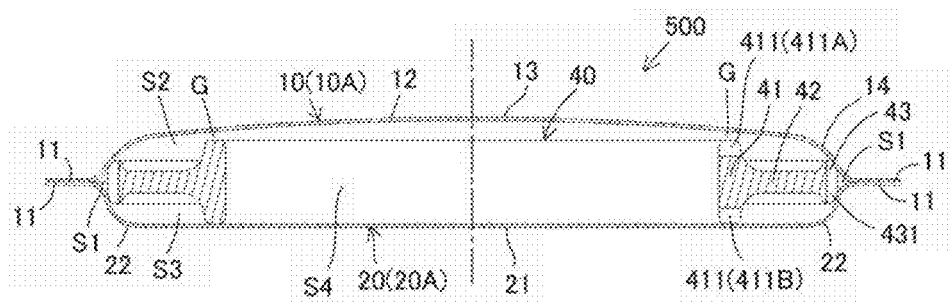

[Figure 11]
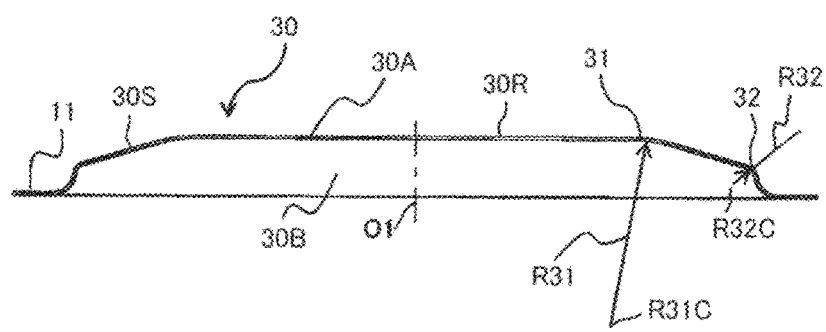
[Figure 12]
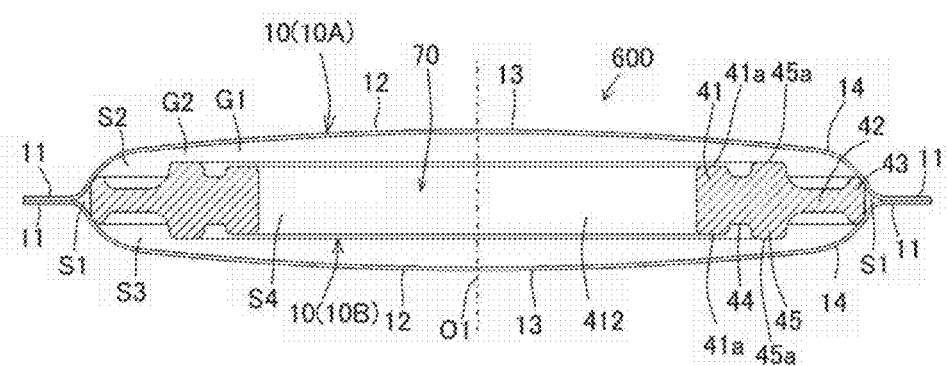

[Figure 13]
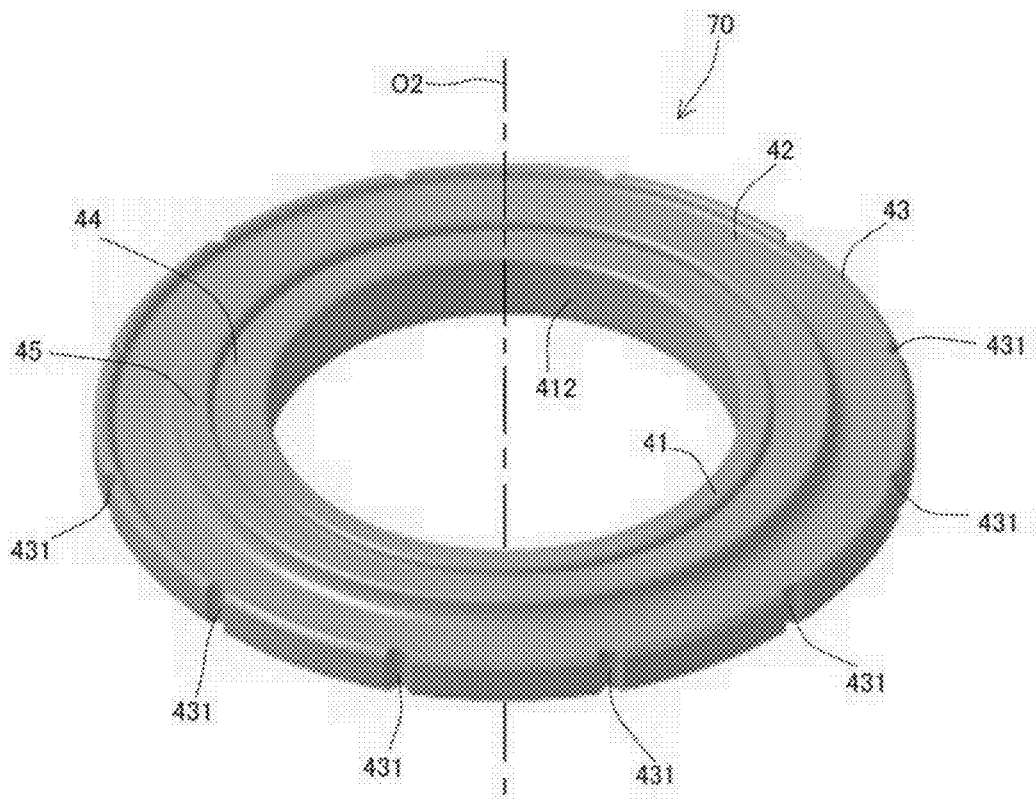
[Figure 14]
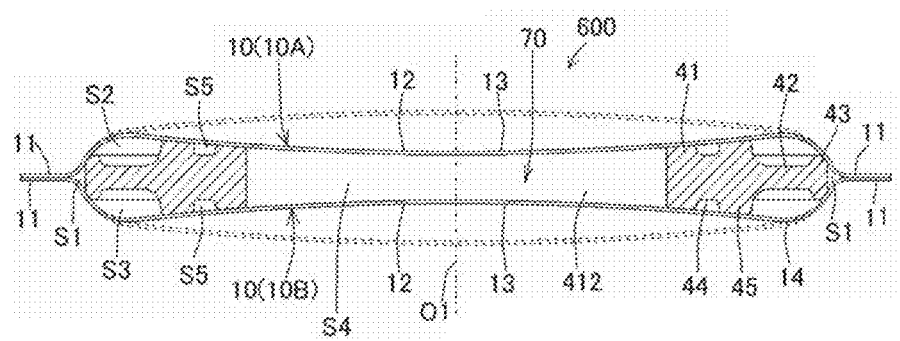

[Figure 15]
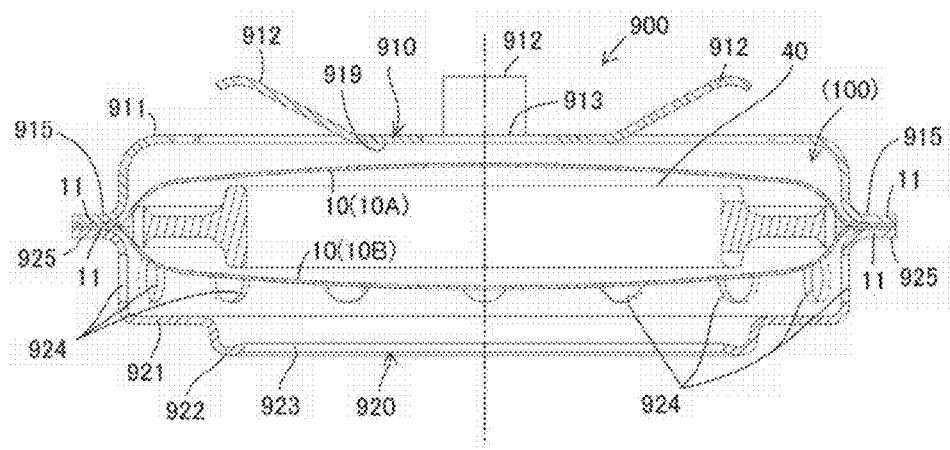

PULSATION DAMPER

TECHNICAL FIELD

The present invention relates to a pulsation damper, and specifically, relates to a pulsation damper capable of effectively reducing pulsation generated in a fuel pump and the like.

BACKGROUND ART

A pulsation damper adopted in a conventional high pressure fuel pump and the like is known (refer for example to Patent Literature 1), wherein a diaphragm disposed in a pressurizing chamber of a housing body absorbs and reduces pulsation of a fluid taken into the pressurizing chamber through an intake passage.

In this type of conventional pulsation damper, the diaphragm is formed by press-working a metal plate formed for example of stainless steel, such that it has a projected portion in one direction and that a ceiling portion (center portion) of the projected portion constitutes a flat surface parallel to a flange on the outer periphery of the diaphragm.

The pulsation damper is configured by performing full-circle welding of the diaphragm to a predetermined flat plate (metal plate), or interposing a flat plate between two diaphragms and performing full-circle welding of the metal plate and the diaphragms, or arranging the two diaphragms to directly face each other without interposing a metal plate, and performing full-circle welding to constitute the pulsation damper.

At this time, inert gas such as helium and nitrogen is sealed as internal gas having a predetermined pressure in a space defined by the diaphragm and the metal plate, or in the space defined by two diaphragms.

Patent Literature 2 discloses an art related to a pulsation damper having two diaphragms arranged on both sides of a plate-like member, wherein an elastic member is arranged in the plate-like member to prevent inner sides of a center portion of the diaphragms from being in contact with the plate-like member if excessive pressure fluctuation (pulsation) occurs and the diaphragms are displaced in a direction approximating each other. According to this technique, even if excessive pressure fluctuation occurs, the diaphragms are prevented from being damaged or subjected to plastic deformation, the reduction of the intrinsic pulsation absorption effect can be prevented, and the deterioration of life of the diaphragms caused by acceleration of fatigue at stress occurrence portions of the diaphragm can be prevented.

CITATION LIST

Patent Literature

[PTL 1] Japanese Unexamined Patent Application Publication No. 2007-309118
[PTL 2] Japanese Unexamined Patent Application Publication No. 2012-197732

SUMMARY OF INVENTION

Technical Problem

According to the art taught in Patent Literature 2, excessive deformation or damaging of the diaphragms is prevented even if excessive pressure fluctuation occurs, but there is a need to provide a member for suppressing excessive deformation in a manner interposed between flange portions disposed on a periphery of the pair of diaphragms and arrange the member in an internal space of the diaphragms, such that there was fear that the configuration of the pulsation damper becomes complex.

Therefore, the object of the present invention is to provide a pulsation damper capable of suppressing excessive deformation of the diaphragms even if significant pressure fluctuation is applied, and in which a member for suppressing the deformation can be arranged via an extremely simple method and in a reliable manner to the internal space of the diaphragm.

Solution to Problem

In order to achieve the objects mentioned above, a pulsation damper according to the present invention includes an upper diaphragm, a lower diaphragm configured to form a sealed space having a predetermined pressure with the upper diaphragm, in which an inert gas is filled, and a deformation suppressing member formed of an elastic material, and an inner cylindrical portion, and an extension portion extending from a center portion on an outer peripheral surface of the inner cylindrical portion such that it extends outward from a center axis of the inner cylindrical portion, wherein the deformation suppressing member is arranged inside the sealed space such that an outer periphery of the extension portion abuts against inner walls of the upper diaphragm and the lower diaphragm.

Further according to the pulsation damper of the present invention, the outer periphery of the extension portion of the deformation suppressing member includes an outer cylindrical portion protruding in a center axis direction of the pulsation damper, and an upper side and a lower side of the outer cylindrical portion abuts against the inner walls of the upper diaphragm and the lower diaphragm.

Moreover, on an outer peripheral portion of the extension portion is formed a first passage that communicates a first space surrounded by an outer peripheral surface of the extension portion, the upper diaphragm and the lower diaphragm, with a second space on an upper-diaphragm-side of the extension portion and a third space on a lower-diaphragm-side of the extension portion.

In a non-loaded condition, the inner cylindrical portion can form a predetermined clearance between at least either the upper diaphragm or the lower diaphragm. At this time, a second passage communicating an inner side of the inner cylindrical portion serving as a fourth space and an outer side of the inner cylindrical portion serving as a second and/or a third space can be formed on at least either the upper-diaphragm-side or the lower-diaphragm-side of the inner cylindrical portion.

Further, the extension portion can include a hole or a notch communicating the upper-diaphragm-side and the lower-diaphragm-side.

According to the pulsation damper of the present invention, at least either a contact portion of the outer peripheral portion of the extension portion with the upper diaphragm or a contact portion of the outer peripheral portion of the extension portion with the lower diaphragm can be formed of a curved surface.

At this time, a radius of curvature of the curved surface can be equal to either a radius of curvature of an inner wall of the upper diaphragm in contact with the curved surface or a radius of curvature of an inner wall of the lower diaphragm in contact with the curved surface.

According further to the pulsation damper of the present invention, if a pressure of an outer surface and a pressure applied to an inner surface are the same, a center portion of at least either the upper diaphragm or the lower diaphragm can be formed to protrude outward.

The pulsation damper may also include an upper cover and a lower cover configured to interpose the upper diaphragm and the lower diaphragm.

The pulsation damper according to the present invention comprises a diaphragm, a plate-like member configured to form a sealed space having a predetermined pressure with the diaphragm, in which an inert gas is filled, and a deformation suppressing member formed of an elastic material, and having an inner cylindrical portion, and an extension portion extending from a center portion on an outer peripheral surface of the inner cylindrical portion such that it extends outward from a center axis of the inner cylindrical portion, wherein the deformation suppressing member is arranged inside the sealed space such that an outer periphery of the extension portion abuts against inner walls of the diaphragm and the plate-like member.

Advantageous Effects of Invention

According to the pulsation damper of the present invention, the deformation suppressing member is arranged in the internal space surrounded by diaphragms, such that excessive deformation of the diaphragms can be suppressed even when a large pulsation occurs.

Moreover, since the deformation suppressing member includes an inner cylindrical portion, and an extension portion extending from the inner cylindrical portion toward an outer side from the center portion of the outer peripheral surface of the inner cylindrical portion, and the outer periphery of the extension portion is arranged to abut against an inner wall of the diaphragms, the deformation suppressing member can be fixed securely without unstableness by simply arranging the deformation suppressing member in the internal space of the diaphragms without adopting a special means (such as means for interposing the member between flanges on an outer periphery of two diaphragms) for arranging the deformation suppressing member in the internal space of the diaphragms.

Further, even if the inner walls of the upper and lower diaphragms abut against the upper and lower sides of the first cylindrical portion and the inner side portion on the inner side of the abutted portions are further contracted, the whole area of the first through fourth spaces can be used as damper volume, and the pulsation reduction effect will not be deteriorated. At this time, by providing a communicating hole to the deformation suppressing member, the first through fourth spaces are mutually communicated, and the whole deformation suppressing member can have lighter weight.

Furthermore, a clearance is provided between the diaphragms and the deformation suppressing member in a state where the pulsation damper of the present invention is in a non-loaded condition, the deforming operation of the diaphragms are not hindered unless excessive pressure is applied thereto, and a preferable pulsation preventing function can be exerted.

According to the pulsation damper of the present invention, the contact portions between the deformation suppressing member and the diaphragms are formed of curved surfaces, such that a closely adhered surface contact is realized between the deformation suppressing member and the diaphragms, and the mounting of the deformation suppressing member can be stabilized. At this time, the radius of curvature of the curved surfaces should preferably be equal to the radius of curvature of the inner walls of the diaphragm.

The pulsation damper according to the present invention can further include an intermediate cylindrical portion that protrudes from the extension portion in a center axis direction of the deformation suppressing member. In this case, a plurality of intermediate cylindrical portions can be formed at predetermined intervals on the extension portion.

If the pulsation damper further includes an upper cover and a lower cover interposing the upper and lower diaphragms, deformation is suppressed both when the upper and lower diaphragms are contracted excessively and when they are expanded excessively, such that the fatigue of the diaphragms is further reduced. Since the diaphragms are not subjected to plastic deformation, the pulsation absorption effect thereof will not be deteriorated.

BRIEF DESCRIPTION OF DRAWINGS

FIG. 1 is a cross-sectional view in which a pulsation damper according to a first embodiment of the invention is cut by a virtual plane including a center line of the pulsation damper.

FIG. 2 is a plan view of the pulsation damper according to the first embodiment of the invention.

FIG. 3 is a perspective view illustrating an outer appearance of a deformation suppressing member illustrated in FIG. 1.

FIG. 4 is an enlarged view of portion A of FIG. 1.

FIG. 5 is a cross-sectional view illustrating a state in which a diaphragm of the pulsation damper according to the first embodiment of the invention is deformed inward by external pressure.

FIG. 6 is a cross-sectional view in which a pulsation damper according to a second embodiment of the invention is cut by a virtual plane including the center line of the pulsation damper.

FIG. 7 is a perspective view illustrating an outer appearance of a deformation suppressing member illustrated in FIG. 6.

FIG. 8 is a cross-sectional view illustrating a state in which a diaphragm of the pulsation damper according to the second embodiment of the invention is deformed inward by external pressure.

FIG. 9 is a perspective view illustrating an outer appearance of a deformation suppressing member applied to a pulsation damper according to a third embodiment of the present invention.

FIG. 10 is a cross-sectional view in which a pulsation damper according to a fourth embodiment of the invention is cut by a virtual plane including the center line of the pulsation damper.

FIG. 11 is a cross-sectional view in which a diaphragm of the pulsation damper according to a fifth embodiment of the invention is cut by a virtual line including the center line of the pulsation damper.

FIG. 12 is a cross-sectional view in which a pulsation damper according to a sixth embodiment of the invention is cut by a virtual plane including the center line of the pulsation damper.

FIG. 13 is a perspective view illustrating an outer appearance of a deformation suppressing member illustrated in FIG. 12.

FIG. 14 is a cross-sectional view illustrating a state in which a diaphragm of the pulsation damper according to the sixth embodiment of the invention is deformed inward by external pressure.

FIG. 15 is a cross-sectional view in which a pulsation damper according to a seventh embodiment of the invention is cut by a virtual plane including the center line of the pulsation damper.

DESCRIPTION OF EMBODIMENTS

First Embodiment

FIG. 1 is a cross-sectional view in which a pulsation damper according to a first embodiment of the present invention is cut by a virtual plane passing a center line of the pulsation damper (hereinafter referred to as a "center cross-section"), and FIG. 2 is a plan view of the pulsation damper according to FIG. 1.

As illustrated in FIGS. 1 and 2, a pulsation damper 100 according to a first embodiment is configured of two diaphragms 10 (an upper diaphragm 10A and a lower diaphragm 10B) having identical shapes with dents facing each other and superposed, and including in an internal space thereof a deformation suppressing member 40 configured to suppress deformation of both diaphragms 10A and 10B, wherein annular flange portions 11 provided on an outer periphery of both diaphragms 10A and 10B are subjected to full-circle welding by laser welding and the like in a state where inert gas such as helium and nitrogen of a predetermined pressure is sealed and filled therein. The deformation suppressing member 40 is arranged in an internal space of the upper and lower diaphragms 10A and 10B, such that a center axis O2 (refer to FIG. 3) of the deformation suppressing member 40 coincides with a center axis O1 of the pulsation damper 100.

FIG. 1 illustrates a state in which an internal pressure (charging pressure of inert gas) and external pressure of the pulsation damper 100 are equivalent. In a state where this pulsation damper 100 is placed in atmosphere (in other words, in a state where the external pressure is lower than the internal pressure of the pulsation damper 100), the pulsation damper 100 is shaped such that a center portion is further expanded, as illustrated by the dashed line denoted by reference number 10P, compared to a state where the internal and external pressures of the pulsation damper 100 are equal (reference number 10).

In other words, in a state prior to welding the flange portion 11, each diaphragm 10 serving as component is shaped in advance as illustrated in FIG. 1.

Each diaphragm 10 is formed such that horizontal cross-sectional surfaces of the respective portions are in a round shape by performing plastic forming such as pressing to sheet metal such as a stainless steel plate.

Each diaphragm 10 has one center curved portion 13 at a center of the center cross-section, which has a center of curvature denoted by reference number R13C and a radius of curvature R13, and an annular curved portion 14 provided on a circumference of the center curved portion 13, having a center of curvature denoted by reference number R14C on the center cross-section and a radius of curvature R14. The radius of curvature R13 is set greater than the radius of curvature R14.

In an outer appearance of the diaphragm 10, the annular curved portion 14 is provided annularly on an outer side in a radial direction of the center curved portion 13. That is, each diaphragm 10 has one annular-shaped annular curved portion 14, and a projected portion 12 having a dome-shaped ceiling portion, with the projected portion 12 projected to one side of the annular flange portion 11.

The center of curvature R13C of the center curved portion 13 and the center of curvature R14C of the annular curved portion 14 are respectively disposed at different positions on an opposite side (inner wall side of the projected portion 12) from the protruding direction of the projected portion 12, and the center of curvature R13C of the center curved portion 13 is positioned on a center of axis O1 of the diaphragm 10.

Next, the deformation suppressing member 40 will be described further with reference to FIGS. 3 and 4.

FIG. 3 is a perspective view illustrating an outer appearance of the deformation suppressing member 40 illustrated in FIG. 1, and FIG. 4 is an enlarged view of portion A of FIG. 1. In FIGS. 3 and 4, the same reference numbers as FIGS. 1 and 2 denote the same or equivalent portions.

The deformation suppressing member 40 is formed approximately annularly centered around a center axis O2 by an elastic material having elasticity, such as rubber, and includes a first cylindrical portion (inner cylindrical portion) 41 centered around the center axis O2 and having a predetermined width (height) in the center axis O2 direction, an extension portion 42 that extends annularly outward from a center portion of the outer peripheral surface of the first cylindrical portion 41, and having a width in the center axis O2 direction smaller than the first cylindrical portion 41, and a second cylindrical portion (outer cylindrical portion) 43 having a width (height) smaller than the width of the first cylindrical portion 41 in the center axis O2 direction and having a width (height) greater than the width of the extension portion 42 in the center axis O2 direction.

A plurality of (12, in the example of FIG. 3) groove-shaped first passages 431 are formed on the outer peripheral portion of the second cylindrical portion 43 in the center axis O2 direction. Further, a groove-shaped second passage 411 is each formed on an upper surface (end portion on the upper diaphragm 10A side) and a lower surface (end portion on the lower diaphragm 10B side) of the first cylindrical portion 41, communicating an inner side with an outer side of the first cylindrical portion 41.

The number of first passages 431 is not restricted to 12, and similarly, the number of second passages 411 formed on each of the upper surface and the lower surface of the first cylindrical portion 41 can be two or greater.

Further, an upper-end outer peripheral surface 432A and a lower-end outer peripheral surface 432B of the second cylindrical portion 43 are respectively formed as curved surfaces.

As described earlier, the deformation suppressing member 40 is arranged within a space sealed by the two diaphragms 10A and 10B. Upon arrangement of the member 40, regardless of whether an external pressure of the pulsation damper 100 having inert gas sealed in an interior thereof is equal to the internal pressure or lower than the internal pressure, in the range denoted by reference B in FIG. 4, upper/lower end outer peripheral surfaces 432 (upper end outer peripheral surface 432A and lower end outer peripheral surface 432B) of the second cylindrical portion 43 formed as curved surfaces are formed to abut against the inner walls near the outer periphery of the upper diaphragm 10A and the lower diaphragm 10B.

Thereby, the deformation suppressing member 40 is fixed and arranged stably and accurately at the center of both diaphragms 10, that is, such that center axes O1 and O2 correspond, without requiring a special fixing means. Moreover, the accommodated position of the deformation suppressing member 40 will not be shifted during operation of the pulsation damper.

In order to have upper/lower end outer peripheral surfaces 432 contact (abut against) the inner walls of the respective diaphragms 10 within the range of reference B, and arrange the deformation suppressing member 40 stably in the internal space of both diaphragms 10, for example, it is preferable to design the radius of curvature of the upper/lower end outer peripheral surfaces 432 to correspond to the radius of curvature of the inner wall of the diaphragm 10 at the contact portion (in the example of FIG. 4, the radius of curvature thereof is denoted by reference number R43, and the center of curvature is denoted by reference number R43C), or even if the radii of curvature do not correspond, it becomes possible to utilize elasticity of the deformation suppressing member 40 so that the surfaces and the inner walls are in close contact by the elastic deformation of the upper/lower end outer peripheral surfaces 432.

Moreover, in a state where the upper/lower end outer peripheral surfaces 432 of the second cylindrical portion 43 respectively abut against the inner walls of the respective diaphragms 10, the first passages 431 are formed such that upper and lower ends 433 (upper end 433A and lower end 433B) of the first passage 431 respectively open to the space on the upper diaphragm 10A side and the lower diaphragm 10B side. That is, a bottom surface portion 43B of the first passage 431 is formed closer to the center axis O2 from the outer peripheral surface of the deformation suppressing member 40 (outer peripheral surface of the second cylindrical portion 43).

The upper/lower end outer peripheral surfaces 432 of the second cylindrical portion 43 abut against the inner walls near the outer periphery of the respective diaphragms 10, such that a first space S1 is formed between the outer peripheral surface of the deformation suppressing member 40 (outer peripheral surface of the second cylindrical portion 43) and both diaphragms 10.

Further, since the upper and lower ends 433 of the first passage 431 are respectively opened to the spaces formed on the sides of the respective diaphragms 10, the first space S1 communicates with a second space S2 and a third space S3 between the extension portion 42 of the deformation suppressing member 40 and respective diaphragms 10.

Moreover, the height of the first cylindrical portion 41 is set such that a clearance G is provided between the respective diaphragms 10 and upper and lower surfaces 413 (upper surface 413A and lower surface 413B) of the first cylindrical portion 41, regardless of whether the external pressure of the pulsation damper 100 in which inert gas is sealed is the same as or lower than the internal pressure thereof.

If the pulsation damper 100 is arranged in a fuel pump, for example, when pulsation occurs to the external pressure of the pulsation damper 100 by pressure application from fuel within a pressurizing chamber of a fuel pump, the upper diaphragm 10A and the lower diaphragm 10B deform by expanding or contracting in the direction of the center axis O1, by which pulsation is attenuated.

A clearance G is respectively provided between the inner walls of the respective diaphragms 10 and (the upper surface 413A and the lower surface 413B of) the first cylinder portion 41 of the deformation suppressing member 40 in a state where the pulsation damper is in a non-loaded condition, the deforming action of the diaphragm 10 will not be hindered unless excessive pressure is applied, and a preferable pulsation preventing function is exerted.

Since the first passage 431 is provided on the second cylindrical portion 43, the first space S1 surrounded by the outer peripheral surface (outer peripheral portion) of the second cylindrical portion 43 and both diaphragms 10 is communicated with the second space S2 on the upper diaphragm 10A side of the extension portion 42 and the third space S3 on the lower diaphragm 10B side thereof, such that the first space S1 can be utilized as a damper volume, contributing to the pulsation reduction effect. That is, the volume of the inner side of the diaphragm 10 can be utilized effectively.

In a state where both diaphragms 10 are contracted significantly, as illustrated in FIG. 5, the diaphragms 10 abut against the upper and lower surfaces 413A and 413B (FIG. 4) of the first cylindrical portion 41 of the deformation suppressing member 40, and thereby, excessive deformation of at least the portion outward from the abutted portion of the diaphragm 10 is suppressed. In FIG. 5, the dashed line illustrates a state where the internal pressure (charging pressure of inert gas) and the external pressure of the pulsation damper 100 are equal.

The upper and lower diaphragms 10A and 10B are equipped with the center curved portion 13, as illustrated in FIG. 1, such that compared to a case where the center curved portion 13 is not provided (in a case where a projected portion of the diaphragm constitutes a parallel surface with a flange portion), a deformation quantity of the diaphragm when pulsation occurs to the external pressure is great, and the pulsation reduction effect is also great, but the great deformation quantity of the diaphragm has a drawback of reduced durability of the diaphragm.

However, according to the first embodiment of the present embodiment, as illustrated in FIG. 5, if the amount of contraction of the diaphragms 10 is great, the diaphragms 10 abut against the upper surface 413A and the lower surface 413B of the first cylindrical portion of the deformation suppressing member 40, such that excessive deformation of the diaphragm 10 is prevented.

A fourth space S4 on the inner circumference side of the first cylindrical portion 41 and the second and third spaces S2 and S3 on the outer periphery side thereof are communicated by the second passage 411A on the upper side and the second passage 411B on the lower side, such that even if the inner walls of the respective diaphragms 10 are abutted against the upper and lower surfaces 413A and 413B of the first cylindrical portion 41 and the portions inward from the portions being abutted against the upper and lower surfaces are contracted, the whole area of first through fourth spaces S1 through S4 can be utilized as damper volume, and a maximum pulsation reduction effect can be exerted.

As described, according to the pulsation damper 100 of the first embodiment of the present invention, the respective diaphragms 10 behave in the above-described manner, such that compared to the conventional type of pulsation damper without the deformation suppressing member 40, excessive deformation of the diaphragms 10 is suppressed, and as a result, deterioration of durability of the diaphragms 10 can be prevented.

Furthermore, by simply inserting the deformation suppressing member 40 in the internal space of both diaphragms 10 without having to provide special fixing means, the diaphragms 10 can be arranged stably to the correct position within the internal space, and the position will not be displaced even while the pulsation damper 100 is operating.

As a result, the pulsation damper having a deformation suppressing effect of diaphragms can be configured by an extremely simple configuration.

According to the above description, the center curved portion 13 is formed at the center of the projected portion 12 of each diaphragm 10, and the annular curved portion 14 is formed at the outer peripheral portion thereof, but it is also possible to provide two or more annular curved portions having different diameters on the outer side of the center curved portion 13.

Further, at least one communication hole (not shown) communicating front and rear sides (the upper diaphragm side and the lower diaphragm side) can be formed on the extension portion 42. The weight of a deformation suppressing member 40 can be reduced by providing such a communication hole.

Second Embodiment

FIG. 6 is a cross-sectional view in which a pulsation damper according to a second embodiment of the present invention is cut at a center cross-section, and the view is equivalent to FIG. 1, and FIG. 7 is a perspective view illustrating an outer appearance of the deformation suppressing member 50 illustrated in FIG. 6. As illustrated in FIGS. 6 and 7, the same reference numbers denote the same or equivalent portions.

As illustrated in FIGS. 6 and 7, according to the second embodiment, the shape of the deformation suppressing member 50 varies from the deformation suppressing member 40 according to the first embodiment.

That is, similar to the deformation suppressing member 40, the deformation suppressing member 50 is formed in an approximately annular shape around the center axis O2 from an elastic material having elasticity, such as rubber, but the member 50 is further equipped with a first cylindrical portion (inner cylindrical portion) 41 centered around the center axis O2 and having a predetermined width (height) in the direction of the center axis O2, and an extension portion 42 extending outward from the center portion of the outer peripheral surface of the first cylindrical portion 41 and having a smaller width than the first cylindrical portion 41 in the direction of the center axis O2. According to the deformation suppressing member 50, the second cylindrical portion 43 that had been provided in the deformation suppressing member 40 according to the first embodiment is not provided, and the extension portion itself extends in the outer peripheral direction of the deformation suppressing member 50, and abuts against the upper and lower diaphragms 10A and 10B. As a result, similar to the deformation suppressing member 40, the deformation suppressing member 50 can be arranged stably within the space surrounded by the diaphragms 10.

Further, a plurality of (12, in the example of FIG. 7) groove-shaped first passages 531 are formed on the outer peripheral portion of the extension portion 42 in the direction of the center axis O2. Similar to the first passages 431 of the first embodiment, the first passages 531 communicate the first space S1 surrounded by the outer peripheral portion of the extension portion 42 and both diaphragms 10 with the second and third spaces S2 and S3 surrounded by the upper and lower surfaces of the extension portion 42 and both diaphragms.

The number of first passages 431 is not restricted to 12. Further, in the example of FIG. 7, one second passage 411 is provided on each of the upper surface and the lower surface of the first cylindrical portion 41 (reference numbers 411A and 411B), but two or more passages 411 can be provided.

By applying the deformation suppressing member 50 designed as described above, similar to the first embodiment, even if the diaphragms 10 are significantly contracted inward, the diaphragms 10 abut against upper and lower surfaces of the first cylindrical portion 41 of the deformation suppressing member 40 (FIG. 8), such that the pulsation suppressing effect can be ensured and excessive deformation of upper and lower diaphragms can be suppressed, according to which deterioration of durability of the diaphragms can be prevented.

Further, by simply inserting the deformation suppressing member 50 in the internal space of the diaphragms 10 without providing any special fixing means, the member 50 can be arranged stably at the correct position within the internal space without having to provide a special fixing means, and the position of the member will not be displaced even during operation of the pulsation damper 200.

Since a second cylindrical portion is not provided, there is a further advantage that the weight of the deformation suppressing member is reduced.

The second cylindrical portion 43 described in the first embodiment exerts an effect that the deformation suppressing member 40 is not easily interposed by the two diaphragms 10 during assembly of the pulsation damper, but according to the present embodiment without the second cylindrical portion, a certain level of thickness is provided to the extension portion 42 to prevent interposing of the deformation suppressing member 50 during assembly.

Third Embodiment

FIG. 9 is a perspective view illustrating an outer appearance of a deformation suppressing member 60 applied to a third embodiment of the present invention. In FIG. 9, the same reference numbers as FIGS. 1 through 8 denote the same or equivalent portions.

Similar to the pulsation damper illustrated in FIGS. 1 and 6, the deformation suppressing member 60 is arranged to be interposed between upper and lower diaphragms 10 in which inert gas is filled, and exerts equivalent functions as the deformation suppressing members 40 and 50.

The deformation suppressing member 60 is formed approximately annularly around a center axis O3 by materials having elasticity, such as rubber, and is equipped with a first cylindrical portion (inner cylindrical portion) 41 centered around the center axis O3 and having a predetermined width (height) in the direction of the center axis O3, a plurality of extension portions 62 extending outward from the center portion of the outer peripheral surface of the first cylindrical portion 41 and having a smaller width than the first cylindrical portion 41 in the direction of the center axis O3, and an expanded portion 63 provided on the outer periphery side of each extension portion 62 with a width smaller than the first cylindrical portion 41 in the direction of the center axis O3 and with a width (height) greater than the width of the extension portions 62 in the direction of the center axis O3. In the example of FIG. 9, six extension portions 62 and six expanded portions 63 are provided, and gaps 65 are formed therebetween.

The plurality of extension portions 62 and expanded portions 63 are shaped such that they are separated into multiple parts by predetermined clearances (gaps 65 of FIG. 9) by forming a plurality of notches between the annular extension portion 42 and the second cylindrical portion 43 disposed on the outer side of the extension portion 42 of the deformation suppressing member 40 illustrated in FIG. 3.

According to the deformation suppressing member 60, an effect similar to deformation suppressing members 40 and 50 can be exerted, and it has a further effect of having a lighter weight compared to the deformation suppressing member 40.

Of course, the number of extension portions 62 and expanded portions 63 can be other than six.

Moreover, at least one communicating hole (not shown) that penetrates the front and rear sides can be formed on the extension portion 62. By providing such a communicating hole, the weight of the deformation suppressing member 60 can be reduced further.

Fourth Embodiment

FIG. 10 is a cross-sectional view in which a pulsation damper according to a fourth embodiment of the present invention is cut at a center cross-section thereof. In FIG. 10, the same references numbers as those in FIGS. 1 through 9 denote the same or equivalent portions.

FIG. 10 illustrates a state in which an internal pressure (charging pressure of inert gas) and external pressure of a pulsation damper 500 are equivalent, and if the pulsation damper 500 is placed in atmosphere (that is, if the external pressure is lower than the internal pressure of the pulsation damper 500), a center portion of the upper diaphragm 10A and a lower diaphragm 20A is expanded than the illustrated shape.

In the pulsation dampers described with reference to FIGS. 1 through 9, the upper diaphragm 10A and the lower diaphragm 10B have identical shapes, but in the pulsation damper 500 illustrated in FIG. 10, the upper diaphragm and the lower diaphragm have different shapes. The details will be descried below.

First, the upper diaphragm 10A is configured in the same manner as described earlier with reference to FIG. 1.

Next, the lower diaphragm 20A is formed such that horizontal cross-sections of respective portions are round, by subjecting a sheet metal such as a stainless steel plate to plastic forming such as pressing, similar to the upper diaphragm 10A, but the structure of the lower diaphragm 20A differs from the upper diaphragm 10A in the following points. That is, the lower diaphragm 20A does not include a center curved portion, but it includes an annular flange portion 11, a flat portion 21 parallel to the flange portion, and an annular curved portion 22 that connects the flange portion and the flat portion 21.

Concaved sides of the upper diaphragm 10A and the lower diaphragm 20A are mutually opposed, the deformation suppressing member 40 is arranged within the diaphragms and inert gas is sealed in the interior thereof, and the flange portion 11 is subjected to full-circled welding, by which the pulsation damper 500 is configured.

Since the lower diaphragm 20A does not have a center curved portion, as illustrated in FIG. 10, if the internal pressure (charging pressure of inert gas) and the external pressure of the pulsation damper 500 are equivalent, the lower surface of the first cylindrical portion 41 provided on the deformation suppressing member 40 is in contact with the lower diaphragm 20A, but if the pulsation damper 500 is placed in atmosphere, the lower diaphragm 20A will be in a state where the center is expanded than the illustrated shape, such that a clearance G is formed between the deformation suppressing member 40, similar to the upper diaphragm 10A side.

In the present embodiment, the shapes of the upper diaphragm 10A and the lower diaphragm 20A differ, such that the behaviors thereof during operation of the pulsation damper 500 also differ.

The fuel pump and other products installing the pulsation damper have various characteristics, and in order to suppress pulsation of such products effectively, there is a need to individually adjust the characteristics of the diaphragm according to the characteristics of the products. However, if the pulsation damper is configured using diaphragms having different shapes, as in the present embodiment, it becomes possible to provide an efficient pulsation damper by selecting two kinds of diaphragms from various types of existing diaphragms, and as a result, the diaphragms do not have to be designed every time to correspond to the characteristics of the fuel pumps, and it is economically advantageous.

Fifth Embodiment

FIG. 11 is a cross-sectional view in which another example of a diaphragm used in a fifth embodiment of the present invention is cut at a center cross-section thereof. In FIG. 11, the same reference numbers as those used in FIGS. 1 through 10 denote the same or equivalent portions. Further, in FIG. 11, gas is not filled in a projected portion 30A, and a state is illustrated in which a pressure on an outer wall side (projected side) of the projected portion 30A and a pressure on an inner wall side are the same.

Similar to diaphragms 10 and 20, a diaphragm 30 of the embodiment is designed to have a round outer shape (the horizontal cross-sections of the respective portions are round) by performing plastic forming such as pressing to a sheet metal such as a stainless steel plate.

Further, the diaphragm 30 includes a first annular curved portion 31 with a center of curvature denoted by reference number R31C and a radius of curvature denoted by R31 in a center cross-section, and a second annular curved portion 32 with a center of curvature denoted by reference number R32C and a radius of curvature denoted by R32, wherein a center portion (ceiling portion 30R) surrounded by the first annular curved portion 31 is a planar shape, such that the diaphragm 30 includes a projected portion 30A protruded to one direction, and has a concaved portion 30B on an opposite side (inner wall side of the projected portion 30A) of the projected portion 30A.

In the outer appearance of the diaphragm 30, the first annular curved portion 31 and the second annular curved portion 32 are formed as two-step annular curved portions on an outer side in the radial direction of the flat-shaped ceiling portion 30R.

The annular flange portion 11 is formed on the outer periphery of the projected portion 30A, and the projected portion 30A protrudes to one side of the annular flange portion 11.

The center of curvature R31C of the first annular curved portion 31 and the center of curvature R32C of the second annular curved portion 32 are provided at different positions on the opposite side (inner wall side of the projected portion 30A) from the direction of projection of the projected portion 30A.

Further, a connecting portion 30S connecting the first annular curved portion 31 and the second annular curved portion 32 are formed to be approximately linear in the center cross-section and inclined with respect to the ceiling portion 30R or the flange portion 11.

The diaphragm 30 according to the fifth embodiment forms two types of annular curved portions (the first annular curved portion 31 and the second annular curved portion 32) in the center cross-section. Therefore, as illustrated in FIG. 11, in a state where the radius of curvature R31 of the first annular curved portion 31 and the radius of curvature R32 of the second annular curved portion 32 have different dimensions, there is no need to provide the connecting portion 30S. In that case, the center of curvatures R31C and R32C are at different positions.

If the radius of curvature R31 of the first annular curved portion 31 and the radius of curvature R32 of the second annular curved portion 32 have the same dimensions, a linearly inclined connecting portion 30S should be provided as illustrated in FIG. 11, and the center of curvatures R31C and R32C should be provided at different positions.

In the fifth embodiment, there are two annular curved portions 31 aNd 32 formed on the diaphragm 30, but three or more annular curved portions can also be formed.

Further, the diaphragm 30 having such shape can replace the diaphragms according to the first to fourth embodiments to form the pulsation damper.

In the present invention, the shape of the diaphragm is not restricted to the configurations described earlier, and any shape can be adopted.

In the first through fifth embodiments, the pulsation damper is formed by opposing the upper diaphragm and the lower diaphragm (that is, the pair of diaphragms), arranging the deformation suppressing member in the interior of the diaphragms, and filling the same with inert gas. However, the present invention is not restricted to this example, and the pulsation damper can be configured by opposing a single flat plate-like member (such as a flat metal plate) and one diaphragm, arranging the deformation suppressing member in the interior thereof, and filling the same with inert gas.

In this case, the shape of the first cylindrical portion or the position thereof with respect to the extension portion (position of the first cylindrical portion in the vertical direction) can be changed arbitrarily such that the deformation suppressing member is not shaken in the position between the flat plate-like member and the diaphragm, in other words, such that the deformation suppressing member does not abut against or be in close contact with the flat plate-like member and the inner wall of the diaphragm. Also, when providing the second cylindrical portion and the expanded portion, the shapes of the second cylindrical portion and the expanded portion or the position thereof with respect to the extension portion can be changed arbitrarily.

Sixth Embodiment

FIG. 12 is a cross-sectional view in which a pulsation damper according to a sixth embodiment of the present invention is cut at the center cross-section, which is a view equivalent to FIG. 1, and FIG. 13 is a perspective view illustrating an outer appearance of a deformation suppressing member 70 illustrated in FIG. 12. In FIGS. 12 and 13, the same references numbers as FIGS. 1 through 5 denote the same or equivalent portions.

As illustrated in FIGS. 12 and 13, in the sixth embodiment, the shape of the deformation suppressing member 70 differs from the deformation suppressing member 40 according to the first embodiment.

That is, the deformation suppressing member 70 is formed substantially annularly around the center axis O2 by an elastic material having elasticity, such as rubber, similar to the deformation suppressing member 40, and in addition to the first cylindrical portion (inner cylindrical portion) 41, the extension portion 42 and the second cylindrical portion (outer cylindrical portion) 43 illustrated in FIG. 1 or FIG. 3, the deformation suppressing member 70 has, on the extension portion 42, a third cylindrical portion (intermediate cylindrical portion) 45 centered around the center axis O2 and protruding in the center axis O2 direction with a somewhat greater width (height) than the first cylindrical portion 41, and an annular concaved portion 44 formed between the first cylindrical portion 41 and the third cylindrical portion 45.

Similar to the first embodiment, the outer peripheral surface of the second cylindrical portion 43 abuts against the upper diaphragm 10A and the lower diaphragm 10B. As a result, the deformation suppressing member 70 is arranged stably within the space surrounded by both diaphragms 10, similar to the deformation suppressing member 40.

By applying the deformation suppressing member 70 having such shape, in a state where external pressure is not applied, as illustrated in FIG. 12, clearances G1 and G2 are respectively formed between the first and third cylindrical portions 41 45 and the upper and lower diaphragms 10A and 10B.

Meanwhile, if the upper and lower diaphragms 10A and 10B are pressed and deformed, as illustrated in FIG. 14, the deformation suppressing member 70 abuts against the inner surface of the diaphragms at two locations (the first cylindrical portion 41 and the third cylindrical portion 45).

Thereby, the contact area between the diaphragms 10A and 10B and the deformation suppressing member 70 is increased, and stress applied on the diaphragm can be reduced even if a high external pressure is applied.

Since the annular concaved portion 44 is formed between the first cylindrical portion 41 and the third cylindrical portion 45, a fifth space S5 is created in a state where the diaphragms 10A and 10B are abutted against the deformation suppressing member 70.

Thereby, the volume of inert gas to be filled in the interior of a pulsation damper 600 can be suppressed while increasing the area of contact between the diaphragms 10A and 10B and the deformation suppressing member 70.

In the sixth embodiment, an example has been illustrated of a case where first and third cylindrical portions are formed in the radial direction of the deformation suppressing member 70, but three or more cylindrical portions can be formed intervening the annular concaved portion.

Further, similar to the deformation suppressing member 40 illustrated in the first embodiment, a plurality of groove-shaped first passages can be formed in the center axis O2 direction on the outer peripheral portion of the second cylindrical portion 43.

Further, a groove-shaped second passage that communicates the inner side or the outer side of the cylindrical portions with the annular concaved portion 44 can be formed on an upper surface or a lower surface of the first cylindrical portion 41 and the third cylindrical portion 45.

If the deformation suppressing member 70 having the above-described shape is applied, similar to the case of the first embodiment, even if the diaphragms 10 are contracted inward greatly, the diaphragms 10 abut against the upper and lower surfaces of the first cylindrical portion 41 and the third cylindrical portion 45 of the deformation suppressing member 40 (FIG. 14), such that the pulsation suppressing effect can be ensured and excessive deformation of the upper and lower diaphragms can be suppressed, by which the deterioration of durability of the diaphragms can be prevented.

At this time, the height of the third cylindrical portion 45 of the deformation suppressing member 70 is set greater than the height of the first cylindrical portion 41, such that as illustrated in FIG. 14, displacement of the diaphragms 10A and 10B can be set great near the center curved portion 13, and the pulsation damper 600 can be applied to a system where higher external pressure is applied.

The deformation suppressing member 70 has the third cylindrical portion 45 designed higher than the first cylindrical portion 41, such that if the diaphragms 10 are contracted inward greatly, the third cylindrical portion 45 and the first cylindrical portion 41 can be abutted against the diaphragms 10 simultaneously, and the deformation suppressing effect of the diaphragms 10 is high.

If the heights of the first cylindrical portion 41 and the third cylindrical portion 45 are formed the same, or if the height of the first cylindrical portion 41 is set higher than the third cylindrical portion 45, the deformation of the center curved portion 13 can be controlled with higher priority than the deformation of the annular curved portion 14.

The suppressing deformation effect can be further enhanced by forming the shapes of the respective ends of the first cylindrical portion 41 and the third cylindrical portion 45 (portions being abutted against the diaphragm) 41a and 45a (refer to FIG. 12) to be R-shaped or tapered, so that they abut against the diaphragms 10 planarly from the initial state.

Seventh Embodiment

The respective pulsation dampers described previously arrange the deformation suppressing member in the internal space of the diaphragms. The deformation suppressing member regulates the amount of contraction in a state where the diaphragm contracts inward.

Meanwhile, a seventh embodiment of the present invention not only suppresses deformation in a state where the diaphragms contract inward, but also suppresses deformation in a state where the diaphragms expand outward.

FIG. 15 is a cross-sectional view illustrating a state in which a pulsation damper according to a seventh embodiment of the present invention is cut at a center of cross-section of the pulsation damper.

A pulsation damper 900 illustrated in FIG. 15 has a cover configured to suppress deformation of diaphragms expanding outward attached to upper and lower sides of the pulsation dampers 100 illustrated in FIG. 1.

That is, the pulsation damper 900 is configured such that flange portions 11 and 11 of the diaphragms 10A and 10B are interposed between a cover flange portion 915 formed on an outer peripheral portion of an upper cover 910 and a cover flange portion 925 formed on an outer periphery of a lower cover 920, and the interposed portion is welded by laser welding and the like.

The upper cover 910 and the lower cover 920 are respectively formed by press-forming a sheet metal such as a stainless steel plate.

The upper cover 910 is equipped with the cover flange portion 915 formed on the outer peripheral portion, and a stepped portion 911 disposed on an inner side thereof. An opening 913 is provided at a center of an upper surface of the stepped portion 911, and a plurality of claws 912 are cut and raised on the periphery of the opening 913.

The lower cover 920 is equipped with a cover flange portion 925 formed on the outer peripheral portion, a first stepped portion 921 provided on an inner side thereof, and a second stepped portion 922 provided on an inner side of the first stepped portion 921. A plurality of round openings 924 are formed on a side surface of the first stepped portion 921, and a large-diameter opening 923 is formed on a bottom surface of the second stepped portion 922.

The pulsation damper 900 covered by these covers 910 and 920 is arranged within the pressurizing chamber of a fuel pump and the like with the opening 923 arranged downward, and by pressing the claws 912 arranged on the upper portion by an appropriate means, the pulsation damper 900 can be installed within the fuel pump and the like by a simple operation without damaging the diaphragms 10.

During operation of the pulsation damper 900, if the diaphragm 10 is expanded excessively by pulsation of external pressure, the diaphragm 10 abuts against a ceiling portion 919 of the upper cover 910, and deformation of the diaphragm is regulated. Thereby, according to the present embodiment, deformation is suppressed both in a state where the diaphragm 10 is excessively contracted or expanded, such that fatigue of the diaphragm 10 is reduced, the life of the diaphragm is not shortened, plastic deformation of the diaphragm will not occur, and pulsation absorption effect of the diaphragm will not be deteriorated.

Moreover, since the diaphragms 10A and 10B are covered by covers 910 and 920, the diaphragms will not be damaged when placing the pulsation damper 900 in the interior of the fuel pump and the like, such that the configuration contributes to further prevention of deterioration of life of the pulsation damper.

It is also possible to have the lower diaphragm 10B abut against the lower cover 920 to suppress deformation of the diaphragm 10B, in a state where the lower diaphragm 10B expands excessively.

REFERENCE SIGNS LIST 100, 200, 500, 600, 900 pulsation damper
10, 20, 30 diaphragm
10A upper diaphragm
10B, 20A lower diaphragm
40, 50, 60, 70 deformation suppressing member
41 first cylindrical portion (inner cylindrical portion)
42, 62 extension portion
43 second cylindrical portion (outer cylindrical portion)
44 annular concaved portion
45 third cylindrical portion (intermediate cylindrical portion)
63 expanded portion
431, 531 first passage
411 second passage

The invention claimed is:
1. A pulsation damper comprising:
   an upper diaphragm;
   a lower diaphragm configured to form a sealed space having a predetermined pressure with the upper diaphragm, in which an inert gas is filled; and
   a deformation suppressing member formed of an elastic material, and comprising an annular ring having a radially inner surface and a radially outer surface, and an extension portion extending from a center portion of the radially outer surface of the annular ring such that the extension portion extends radially outward from a center axis of the annular ring,
   wherein the deformation suppressing member is arranged inside the sealed space such that a radially outer portion of the extension portion abuts against inner walls of the upper diaphragm and the lower diaphragm, and
   wherein on a radially outer peripheral portion of the extension portion is formed a first passage that communicates a first space surrounded by a radially outer peripheral surface of the extension portion, the upper diaphragm and the lower diaphragm, with a second space on an upper-diaphragm side of the extension portion and a third space on a lower-diaphragm side of the extension portion.

2. The pulsation damper according to claim 1, wherein the radially outer portion of the extension portion of the deformation suppressing member comprises an outer cylindrical portion protruding in a center axis direction of the pulsation damper, and an upper side and a lower side of the outer cylindrical portion abut against the inner walls of the upper diaphragm and the lower diaphragm.

3. The pulsation damper according to claim 1, wherein in a non-loaded condition, the annular ring forms a predetermined clearance between at least either the upper diaphragm or the lower diaphragm.

4. The pulsation damper according to claim 1, wherein a second passage communicating an inner side with an outer side of the annular ring is formed on at least either an upper-diaphragm side or a lower-diaphragm side of the annular ring.

5. The pulsation damper according to claim 1, wherein an intermediate cylindrical portion protruding in a center axis direction of the deformation suppressing member is further provided on the extension portion.

6. The pulsation damper according to claim 5, wherein the extension portion has a plurality of the intermediate cylindrical portions formed at a predetermined interval.

7. The pulsation damper according to claim 1, wherein if a pressure applied to an outer surface and a pressure applied to an inner surface are the same, a center portion of at least either the upper diaphragm or the lower diaphragm is formed to protrude outward.

8. The pulsation damper according to claim 1, wherein the pulsation damper further comprises an upper cover and a lower cover configured to interpose the upper diaphragm and the lower diaphragm.

9. The pulsation damper according to claim 1, wherein the extension portion comprises a hole or a notch communicating the upper-diaphragm side with the lower-diaphragm side.

10. A pulsation damper comprising:
an upper diaphragm;
a lower diaphragm configured to form a sealed space having a predetermined pressure with the upper diaphragm, in which an inert gas is filled; and
a deformation suppressing member formed of an elastic material, and comprising an inner cylindrical portion, and an extension portion extending from a center portion on an outer peripheral surface of the inner cylindrical portion such that the extension portion extends outward from a center axis of the inner cylindrical portion,
wherein the deformation suppressing member is arranged inside the sealed space such that an outer periphery of the extension portion abuts against inner walls of the upper diaphragm and the lower diaphragm,
wherein on an outer peripheral portion of the extension portion is formed a first passage that communicates a first space surrounded by an outer peripheral surface of the extension portion, the upper diaphragm and the lower diaphragm, with a second space on an upper-diaphragm side of the extension portion and a third space on a lower-diaphragm side of the extension portion, and
wherein at least either a contact portion of the outer peripheral portion of the extension portion with the upper diaphragm or a contact portion of the outer peripheral portion of the extension portion with the lower diaphragm is formed of a curved surface.

11. The pulsation damper according to claim 10, wherein a radius of curvature of the curved surface is equal to either a radius of curvature of an inner wall of the upper diaphragm in contact with the curved surface or a radius of curvature of an inner wall of the lower diaphragm in contact with the curved surface.

12. A pulsation damper comprising:
a diaphragm;
a plate-like member configured to form a sealed space having a predetermined pressure with the diaphragm, in which an inert gas is filled; and
a deformation suppressing member formed of an elastic material, and comprising an inner cylindrical portion, and an extension portion extending from a center portion on an outer peripheral surface of the inner cylindrical portion such that the extension portion extends outward from a center axis of the inner cylindrical portion,
wherein the deformation suppressing member is arranged inside the sealed space such that the deformation suppressing member abuts against inner walls of the diaphragm and the plate-like member, and
wherein a second passage communicating an inner side with an outer side of the inner cylindrical portion is formed on at least either a diaphragm side or a plate-like member side of the inner cylindrical portion.

* * * * *